3,224,882
AERATING COMPOSITION FOR FATS AND SHORTENINGS CONTAINING SAME
John V. Luck, Palatine, and Rudolph H. Ellinger, Mount Prospect, Ill., assignors to The Glidden Company, Cleveland, Ohio, a corporation of Ohio
No Drawing. Filed July 8, 1963, Ser. No. 293,253
7 Claims. (Cl. 99—123)

This invention relates to an improved aerating composition for edible triglyceride fats and to fat-based shortenings containing such aerating composition. Advantages of our invention over similar compositions heretofore proposed include improved effective aeration of edible fats and substantial solubility therein.

Good air-entrapping properties of shortening compositions and prepared food mixes containing such shortening compositions are very important because the lightness, tenderness, high volume, and palatability of the resulting baked goods, whipped toppings, icings, etc. employing such fats are dependent upon the amount, thoroughness, and fineness of the air dispersed therein by the conventional preparatory mixing operations. Chemically-leavened baked goods such as cakes, and particularly high-ratio cakes (using more sugar than flour), are especially sensitive indicators of the gas-entrapping effectiveness of a shortening.

For a given cake recipe, there is a general correlation between the specific gravity of the batter and the final volume of the cake baked therefrom. Aeration and homogeneity of the batter can be checked by microscopic examination. A batter of desirably low specific gravity has small, numerous air bubbles fairly evenly dispersed; this indicates a final cake of high volume and fine texture; under polarized light the thoroughness of the fat dispersion can be seen. The more thoroughly the fat is dispersed among the starch particles, the finer is the texture and the more tender is the resulting cake.

The most desirable cakes from a standpoint of texture are those which exhibit a high volume and are light and tender because of thorough aeration of their batters. Cakes made from a poorly aerated batter tend to be tough and chewy, and even if their volume might be atypically high, they are not considered particularly good. In order to obtain a measure of aeration performance which takes into account both desirable aeration of the batter and the volume of the cake resulting therefrom, we divide the cake volume (in units of cubic centimeters per pound) by the specific gravity of the batter (related to water) from which the cake was made. For convenience we call this quotient the "volume index." The higher the volume index, the more acceptable is the cake.

Heretofore many additives, e.g., monoglycerides, diglycerides and free fatty acids, and glycerol mixed esters of water soluble hydroxy carboxylic and fatty acids have been proposed for compounding into plastic and normally liquid fats to improve their shortening effectiveness with respect to air-entrapment and dispersibility, e.g., U.S. Patents 2,868,652 and 3,011,896. Acyl lactylic acids having acyl radicals of saturated and unsaturated fatty acids containing from 16–22 carbon atoms, and from 1 to 6 or more lactylic groups in the molecule recently have been proposed in this connection with plastic fats.

Preparation of such acyl lactylic acids is shown in U.S. Patents 2,789,992; 2,733,252; and 2,744,825. U.S. Patent 2,973,270 shows the incorporation of various of such acyl lactylic acids into plastic shortenings useful for making baked goods, such as cakes from prepared mixes. The functional acyl lactylic acids can be made, for example, by directly esterifying fatty acids with lactic acid, or by reacting fatty acid chlorides with lactic acid, and removing the volatile byproducts of the reaction.

The tendency of lactic acid to react with itself can give rise to a variable proportion of fatty acid esters of lactyllactic acid and polylactyllactic acids depending upon the reaction procedure used and its control. For convenience herein we refer to these as "acylated polylactic acids" as distinguished from "acyl-1 lactylic acids" by which we mean but one lactyl radical in the molecule. Additionally, in syntheses using fatty acid or fatty acid mixtures, a variable minor proportion of unreacted fatty acid can be present in the resulting acyl lactylic acid product.

We have now found that significant improvements in the aerating performance of acyl lactylic acid compositions and shortenings containing same can be obtained by the critical proportioning of selected components. Our aerating composition for triglyceride fats consists essentially of a blend of about 2.3–4 parts of stearyl-1 and palmityl-1 lactylic acids with one part of free stearic and palmitic acids, said composition containing, on the basis of said acyl-1 lactylic acids, not substantially more than about 10% and preferably about 4%, for greatest efficiency, of acylated polylactic acids. Our improved shortening comprises triglyceride fat in which is intimately dispersed about 1–5% of this aerating composition.

Because the acyl lactylic acids of our selection are derived from natural products, small proportions of other $C_{14-22}$ fatty acid acryl radicals (i.e., about 10% maximum of the acyl-1 lactylic acids in the aerating composition) can be present and tolerated without significant effect. Those having less than 17 carbon atoms are considered broadly herein as "palmityl" and those having 17 carbon atoms or more are considered broadly herein as "stearyl." Thus, minor percentages of, for example, myristyl, margaryl, arachnidyl, behenyl, and oleyl lactylic acids can be tolerated. Similarly, the fatty acids of our selection are natural products, and small proportions of other $C_{14-22}$ fatty acids (about 10% maximum, based on the free fatty acids present) can be tolerated, and we make the same broad division based on their carbon chain length.

The following tabulations are from our experimental data. They show unforeseen critical effects of composition variables on volume index measurement of cakes made from a standard yellow test cake recipe using a uniform mixing and baking procedure. Expressed in baker's measure, with the weight of flour taken as 100%, the recipe was as follows:

| Ingredients: | Percent |
|---|---|
| Cake flour | 100 |
| Shortening | 55 |
| Sugar | 140 |
| Salt | 3.5 |
| Baking powder | 6.25 |
| Water | 40 |
| Non-fat dry milk powder | 10 |

The foregoing ingredients were mixed for three minutes in a conventional culinary mixer, and then there was added:

| | |
|---|---|
| Whole eggs | 60 |
| Water | 60 |
| Vanilla | 3 |

The entire recipe was then mixed for three minutes more and baked at 365° F.

The shortening made up in each test was refined, bleached soybean oil in which was dispersed 3% of a particular aerating composition under test. All made clear solutions at room temperature after melting and cooling in the oil except for those blends containing 35% or more free fatty acids. All proportions referred to herein are proportions by weight, and all percentages are weight percentages.

The most dramatic and surprising effect was obtained when the proportion of free fatty acid was the significant variable in the aerating composition. In the following test series the composition of the free fatty acid was about 5 parts of stearic to 1 part of palmitic, the ratio of stearyl-1 lactylic acid to palmityl-1 lactylic acid was 3.7–3.8:1 in all entries but the fourth where it was 3.4:1, and the percentage of stearyl and palmityl polylactic acids was in the narrow range of 1.4–1.9% of the aerating composition.

*Table I*

| Free fatty acid, percent | Ratio, free stearic acid to free palmitic acid | Acyl-1 lactylic acids, percent | Volume index |
| --- | --- | --- | --- |
| 10.1 | 4.93:1 | 88 | 2,120 |
| 15 | 5:1 | 83.2 | 2,340 |
| 20 | 4.72:1 | 78.3 | 2,830 |
| 25 | 5.08:1 | 73.4 | 3,160 |
| 30 | 4.9:1 | 68.6 | 2,950 |

The pronounced maximum in volume index occurs between 20% and 30% free fatty acid. Expressed proportionally this range is 2.3–4 parts of stearyl-1 and palmityl-1 lactylic acids per part of the free stearic and palmitic acids.

The effects of varying the ratio of free stearic to free palmitic acid significantly in the aerating composition were less pronounced. The tests did, however, show a maximum volume index when the ratio of free stearic to free palmitic acid was broadly in the range from 3–8:1 and preferably about 4:1, although the high proportion of free palmitic over free stearic acid gave a good volume index. The minimum performances occurred when the free stearic to free palmitic acid ratio was broadly in the range from 1:2 to 2:1, particularly at 1:1, and beyond 8:1, particularly at 11.5:1. In the tests tabulated below the total free fatty acid was 24.9—25%, the total stearyl-1 plus palmityl-1 lactylic acids 73.4% with the ratio of stearyl to palmityl lactylic acids 3.4:1 and acylated (stearyl and palmityl) polylactic acids was 1.7%.

*Table II*

| Free stearic to free palmitic acid: | Volume index |
| --- | --- |
| 1:4.3 | 2940 |
| 1:1 | 2790 |
| 3.3:1 | 2970 |
| 5.08:1 | 3160 |
| 11.5:1 | 2730 |

When the aerating composition was formulated to 24.8–25% of free stearic and palmitic acids, with the ratio of free stearic to free palmitic acid being essentially 5:1 (4.6–5.2:1), and the significant variable was the decrease in the percentage of stearyl-1 and palmityl-1 lactylic acids while increasing the stearyl and palmityl polylactic (lactyl lactylic and polylactyl lactylic) acids correspondingly, the trend in volume index of the resulting cake was decidedly downward as follows:

*Table III*

| Acylated polylactic acids, percent | | Acyl-1 lactylic acids, percent | Volume index |
| --- | --- | --- | --- |
| Basis total composition | Basis acyl-1 lactylic acids | | |
| 1.1 | 1.5 | 74.1 | 3,170 |
| 1.7 | 2.3 | 73.4 | 3,160 |
| 2.0 | 2.7 | 73.0 | 2,860 |
| 3.1 | 4.3 | 72.0 | 2,670 |
| 10.6 | 16.5 | 64.4 | 2,560 |

From the tests there was also a decided showing that when the significant variable was an increase the preponderance of stearyl-1 lactylic acid over palmityl-1 lactylic acid, the aerating composition gave superior results. Thus, for example, when we used aerating compositions containing 2% or less acyl (stearyl and palmityl) polylactic acids at a free fatty acid percentage of 24.8–25, with a ratio of free stearic to free palmitic acid of essentially 5:1 (5.08–5.2:1), the trend was as follows:

*Table IV*

| Ratio of stearyl-1 lactylic acid to palmityl-1 lactylic acid plus margaryl-1 lactylic acid | Total acyl-1 lactylic acids, percentage | Volume index |
| --- | --- | --- |
| 1.8:1 | 73 | 2,860 |
| 3.15:1 | 73.4 | 3,160 |
| 15.5:1 | 74.1 | 3,170 |

All aerating composition blends having a preponderance of palmity-1 lactylic acid over stearyl-1 lactylic acid gave substantially lesser performance.

The best aerating composition of the entire series of tests gave a cake having volume index of 3170, and this cake was one of the finest of its type for high volume, tenderness, fine and even texture, and all-around eating qualities. Precise formulation of this composition based on vapor phase chromatographic analyses was as follows: 4% free palmitic acid, 20.80% free stearic acid, 3.1% palmityl-1 lactylic acid, 1.4% margaryl-1 lactylic acid, 69.6% stearyl-1 lactylic acid, 0.2% palmityl lactylic acid, and 0.9% stearyl lactyl lactylic acid.

A close second in performance gave a volume index of 3160. Precise formulation of this composition was as follows: 4.1% free palmitic acid, 20.8% free stearic acid, 16.6% palmityl-1 lactylic acid, 1.1% margaryl-1 lactylic acid, 55.7% stearyl-1 lactylic acid, 0.8% palmityl lactyl lactylic acid, 0.7% stearyl lactyl lactylic acid, and 0.2% palmityl dilactyl lactylic acid.

While some free lactic acid (that is, lactic and polylactic acids) can be present in the aerating composition as a residue from chemical preparation, it is important to keep the amount very low, not substantially more than about 1% based on the acyl lactylic acids present, and preferably not more than about 0.25% so that the aerating composition has a bland taste, and when heated moderately does not give off unpleasant fumes.

The foregoing demonstrates the following especially critical compositional factors for superior aeration with triglyceride fats: (a) the ratio of stearyl-1 and palmityl-1 lactylic acids (the acyl monolactylic acids) to free stearic and palmitic acids must be between about 2.3:1 and 4:1 (expressed as a weight percentage in a simple blend of the acyl-1 lactylic and free fatty acids this is about 70–80% acyl-1 lactylic acid and the balance free fatty acids); and (b) the amount of acyl (palmityl and stearyl) lactyl lactylic and polyactyl lactylic acids i.e. acyl-(N>1) lactylic acids, must be kept below about 10% basis the weight of these acyl-1 lactylic acids.

An additional important and critical factor shown for best aeration is the use of a predominance of stearyl-1 lactylic over palmityl-1 lactylic acid, advantageously at least about 3 parts of the former to 1 part of the latter. The composition of the free fatty acids for maximum beneficial aerating effect is controlled between about 3 and 8 parts of stearic acid to 1 part of palmitic, although when as much as 4 parts of palmitic to 1 part of stearic is used, the aerating effect is quite favorable.

The shortening containing our aerating composition is preponderantly of triglyceride fat. Use of substantially less than 1% of our aerating composition therein is insufficient to give desirably large aeration effects, and use of more than about 5% increases product cost without conferring substantial aerating effectiveness. For efficiency and economy we have found it advantageous to use between about 1.5 and 4% and preferably 2-3% of our aerating composition in shortenings. As shown in the foregoing cake tests, no other aerating, emulsifying or stabilizing agents need be used to obtain excellent performance with the simplest culinary oils. These can be, if desired, highly polyunsaturated.

The shortening can have, of course, many other conventional shortening additives in its such as antioxidants, e.g., benzoic acid or butylated hydroxy anisole, algin derivatives, lecithin, monoglycerides, diglycerides, acetoglycerides, glycerol mixed esters of water soluble hydroxy carboxylic and fatty acids, sorbitan esters of fatty acids, polyoxyalkylene derivatives of sorbitan esters of fatty acids, glycol esters of fatty acids, fatty acid esters of polyglycerols, tartaric acid esters of monoglycerides, stearyl monoglyceridyl citrate, fatty acid esters of citric acid such as dipalmityl or distearyl citrate, antifoaming and antispattering agents, food colors, and various mixtures of same. It can be made in the plastic state or the normally fluid or liquid state (stable and pourable at room temperature). The additives are dissolved or dispersed in the fat in conventional manner; for plastic shortenings this involves preferably warming the mixture until a clear melt is formed, then quickly cooling the mass while it is agitated, and finally tempering until the fat crystals formed take their stable configuration.

We claim:

1. An aerating composition for triglyceride fats consisting essentially of a blend of about 2.3-4 parts of stearyl-1 and palmityl-1 lactylic acids with one part of free stearic and palmitic acids, the stearyl-1 lactylic acid predominating over the palmityl-1 lactylic acid, said composition containing, on the basis of said acyl-1 lactylic acids, not substantially more than about 10% acylated polylactic acids.

2. The aerating composition of claim 1 wherein there is not substantially more than about 4% acylated polylactic acids.

3. The aerating composition of claim 1 wherein the free stearic to free palmitic acid ratio is 3-8:1.

4. An improved shortening comprising triglyceride fat in which is intimately dispersed about 1-5% of the following aerating composition: about 2.3-4 parts of acyl-1 lactylic acids consisting essentially of stearyl-1 lactylic acid and palmityl-1 lactylic acid, the stearyl-1 lactylic acid predominating over the palmityl-1 lactylic acid, one part of higher acyl fatty acids consisting essentially of stearic and palmitic acids, and, on the basis of said acyl-1 lactylic acids, not substantially more than about 10% acylated polylactic acids.

5. The shortening of claim 4 wherein the triglyceride fat is normally liquid.

6. The shortening of claim 4 wherein the aerating composition contains not substantially more than about 4% acylated polylactic acids.

7. The shortening of claim 4 wherein the free stearic to free palmitic acid ratio is 3-8:1.

References Cited by the Examiner
UNITED STATES PATENTS

| | | | |
|---|---|---|---|
| 2,733,252 | 1/1956 | Thompson et al. | 99—123 |
| 2,973,270 | 2/1961 | Thompson et al. | 99—123 |
| 3,071,472 | 1/1963 | Hager et al. | 99—94 |

A. LOUIS MONACELL, *Primary Examiner.*